United States Patent [19]

Ishiwata

[11] Patent Number: 5,541,658
[45] Date of Patent: Jul. 30, 1996

[54] IMAGE CODING-DECODING APPARATUS WITH EFFICIENT MEMORY ACCESS

[75] Inventor: Shunichi Ishiwata, Chiba-ken, Japan

[73] Assignee: Kabushiki Kaisha Toshiba, Kawasaki, Japan

[21] Appl. No.: 265,929

[22] Filed: Jun. 27, 1994

[30] Foreign Application Priority Data

Jun. 29, 1993 [JP] Japan ................... 5-158531

[51] Int. Cl.⁶ .................. H04N 7/12; H04N 9/64
[52] U.S. Cl. .................. 348/394; 348/410; 348/411; 348/415; 348/699; 348/700; 348/716; 348/717
[58] Field of Search .................. 348/416, 394, 348/415, 398, 402, 409, 419, 407, 700, 699, 411, 412, 450, 420, 717, 718, 719

[56] References Cited

U.S. PATENT DOCUMENTS

| | | | |
|---|---|---|---|
| 5,021,880 | 6/1991 | Graves | 348/699 |
| 5,093,720 | 3/1992 | Krause et al. | 348/416 |
| 5,124,790 | 6/1992 | Nakayama | 348/409 |
| 5,170,259 | 12/1992 | Niihara et al. | 348/394 |
| 5,177,797 | 1/1993 | Takenaka et al. | 348/417 |
| 5,347,308 | 9/1994 | Wai | 348/407 |
| 5,384,581 | 1/1995 | Ikeda | 348/699 |
| 5,408,269 | 4/1995 | Tsukagoshi | 348/700 |
| 5,412,435 | 5/1995 | Nakajima | 348/700 |

FOREIGN PATENT DOCUMENTS 0503956  9/1992  European Pat. Off. .

Primary Examiner—Tommy P. Chin
Assistant Examiner—Anand S. Rao
Attorney, Agent, or Firm—Foley & Lardner

[57] ABSTRACT

An image coding and decoding apparatus which can produce an improved amount of the effective data per time unit especially in a case where the image data are processed in the field unit. The apparatus includes: a subtracting unit which subtracts a reference image signal from an input image signal; a intra-frame coding unit which codes the image signal sent from the subtracting unit, and data on a reference image signal; and an inter-frame prediction unit which performs an image prediction process among previous or future image data and which sends the reference image signal to the subtracting unit and the intra-frame coding unit, wherein the apparatus is characterized in that the inter-frame prediction unit includes an input-output circuit in which pixel data of luminance signals are separated from those of color signals, and the thus separated pixel data are arranged in a single row of a horizontal direction as a minimum unit, so that the amount of effective data accessible in a time unit can be significantly increased in the course of processing data in the field unit.

2 Claims, 14 Drawing Sheets

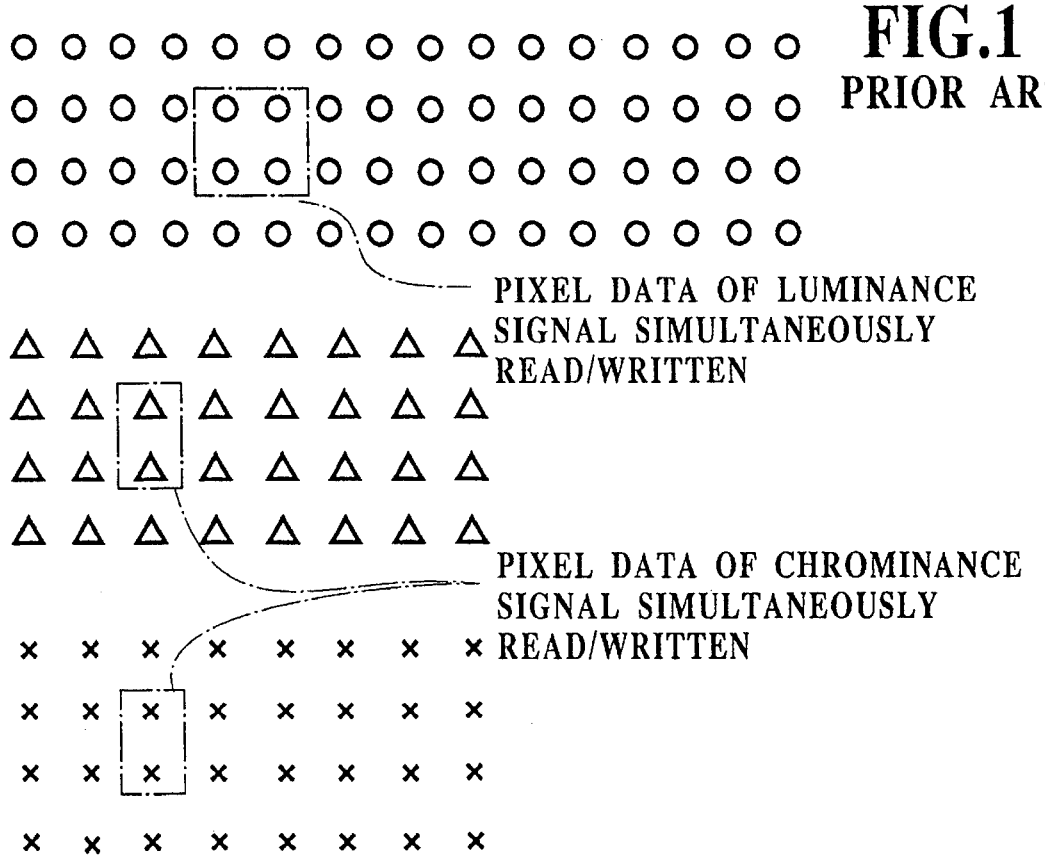

<READING OF REFERENCE IMAGE IN A FIELD UNIT>

UNNECESSARY PIXELS

VALUE OF ● = $\dfrac{①+②+③+④}{4}$

①~④ : VALUE OF PIXEL IN EXISTENCE

Y : 17 PIXELS, Cb : 9 PIXELS, Cr : 9 PIXELS

PIXELS TO BE READ FROM MEMORY UNIT

○ : Y PIXEL
△ : Cb PIXEL
× : Cr PIXEL

PIXELS TO BE READ FROM MEMORY UNIT
○ : Y PIXEL
△ : Cb PIXEL
× : Cr PIXEL

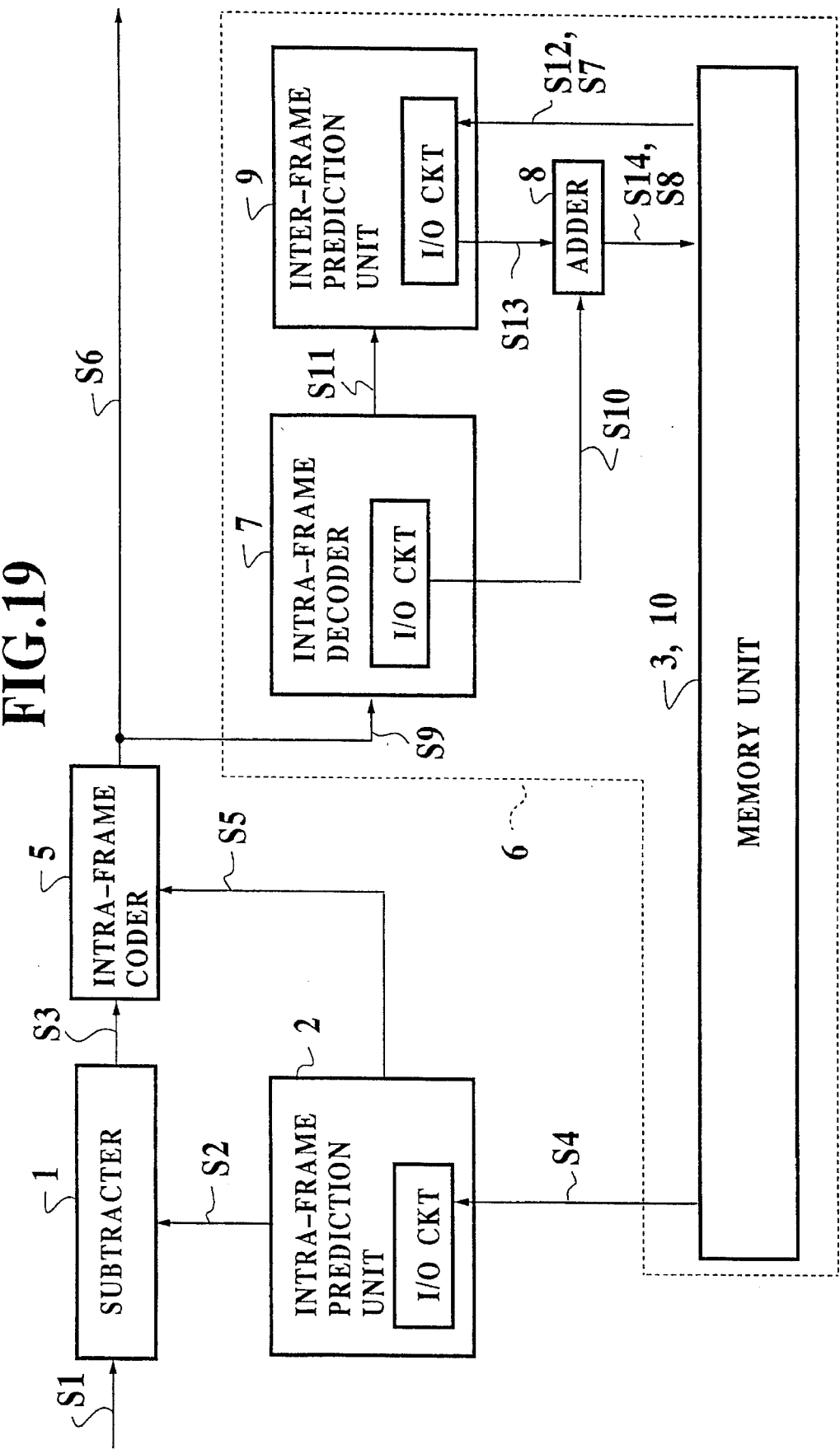

IMAGE CODING-DECODING APPARATUS WITH EFFICIENT MEMORY ACCESS

BACKGROUND OF THE INVENTION

1. Technical Field

The present invention relates to an image coding and decoding apparatus which concurrently reads/writes a plurality of pixel data from/to a memory.

2. Background Art

In a process where digital motion picture signals are compression-coded and decompression-decoded in a real time basis, a data processing amount becomes unduly large in a unit of time.

In this specifications, terms compression and coding are interchangeably used; similarly, terms decompression and decoding are interchangeably used.

Accompanied by this large amount of data to be processed, a data quantity also becomes large which is read/ written from/to a memory. These data are temporarily stored in the memory in a coding/decoding apparatus. Since there is the limit in a rate of reading and writing data in the memory, it is indispensable that the plural pixel data be read from and written to the memory concurrently and in parallel.

When the plural pixel data are simultaneously read from and written to the memory, pixel data, which is in reality not necessary to be read/written, are also read and written. The amount of such unnecessary data depends on processing combination where a stream of pixel data are concurrently processed with another stream of pixel data. Thus, even though pixel data to be concurrently processed is the same, an amount of effective data capable of being read/written in a unit of time differs depending on how the pixel data are combined for the processing purpose. Such a difference becomes more significant in a motion-picture-signal processing based on an ISO, MPEG standard and so on which include a processing in which an image is reconstructed from a reference image through a motion compensation. Here, the ISO stands for International Standard Organization, and MPEG stands for Moving Picture Experts Group.

Now, in the event that the reference image is read out of the memory and then the plural pixel data are concurrently read out, there is a problem where unnecessary pixel data is mixed into the data read out. The less the amount of the unnecessary pixel data are, the more readable the amount of the effective data is per unit time.

In view of the above-described points, the luminance-signal pixel data of 2 pixels in the vertical direction and 2 pixels in the horizontal direction are simultaneously processed with chrominance signal (Cb) and another chrominance signal (Cr) having the same position with the luminance signal, in the conventional practice as shown in FIG. 1. In FIG. 1, a small circle represents a luminance signal, a small triangle represents a chrominance signal (Cb), and an symbol X represents a chrominance signal (Cr).

In this method described above with reference to FIG. 1, the amount of unnecessary data read at the time of reading a reference image is minimal as far as the image processing is carried out only in a frame unit.

It is to be noted that two field scanning lines are equivalent to a single frame scanning line.

On the other hand, it is reported that when the image data are processed not only in the frame unit but also in a field unit, the image compression efficiency is improved further. When the image data are processed in the field unit, the image data of the odd-numbered row and the image data of the even-numbered row within a frame belong to a different field respectively, as related to interlaced scanning of a television display.

Referring to FIG. 1, since the adjacently-disposed vertical 2 pixels are simultaneously processed, the pixel data belonging to the different field are also read/written from and to the memory. In other words, even though the pixel data belonging to one stream of field only is reqired to be read/written from and to the memory, other pixel data belonging to the other stream of field is inevitably read/written from and to the memory. As a result thereof, two times of the necessary amount of data are read out and written in reality.

Now, according to a visual characteristic intrinsic to the human nature, a sensitivity against color signals (chrominance signals) is dull compared to that against the luminance signals. Utilizing this characteristic, there is often used an image mode called 4:2:0 in which the color signal is compressed by a half in horizontal and vertical directions, respectively. If this 4:2:0 mode is employed, the ratio of luminance-signal pixel data amount over color-signal pixel data amount becomes 2:1.

However, the ratio of the luminance-signal pixel data amount over the color-signal pixel data amount is 1:1 in the method shown in FIG. 1. Thus, half of the color signals are wasted data which are not used in the course of image reconstruction. In other words, 4/3 times,of the data which are necessary for reconstructing the image are read/written.

In order to display the pixel data in the 4:2:0 image mode, an interpolation process is required in which the color signals are interpolated in the vertical direction. Then, two pixel data each of which locates by a distance of one row from other in the same field are read out of the memory, and then an average of the two is taken. Then, the average-taken pixel which is equivalent to one pixel is interpolated.

Therefore, referring to FIG. 1, reading is carried out twice. However, the color-signal pixel data and the luminance-signal pixel data are simultaneously read out, the luminance-signal pixel data are read also twice in the conventional practice shown in FIG. 1. In other words, the luminance-signal image data are read out twice unnecessarily at the time the pixel data are displayed on a display unit.

This is also illustrated in FIG. 2 and FIG. 3.

In FIG. 2, there are shown dotted triangle and X marks; this means that the dotted triangle mark (Cb pixel) and the dotted X mark (Cr pixel) are not existent in the 2:0 mode. Thus, in the 4:2:0 mode, the Cb pixel which is right above the dotted triangle mark (Cb pixel), and the dotted triangle are added so that an average thereof is taken to calculate the value of the dotted Cb pixel. As for dotted X mark (Cr pixel), similar procedure is taken as in the dotted triangle mark (cb pixel). Note that, in order to display the image, the values of both dotted triangle mark (Cb pixel) and dotted X mark (Cr pixel) are necesary in the 4:2:0 mode.

Now, though Y, Cb and Cr pixels are separately illustrated in FIG. 1, those are combindedly expressed in FIG. 2. In FIG. 1, the interval between the Cb pixels are wider than the interval between luminance (Y) pixels; in a real image viewed, the interval between the Cb pixels is twice as that between Y pixels. Similarly, the interval between the Cr pixels is twice as that between Y pixels. In FIG. 2, such a relation between the Y and color difference signals in terms of the interval is reflected, so that the interval between color signals is twice as that between Y signals. It is to be noted that, although the positions of the Cb pixel and Cr pixel are different in FIG. 2 for the sake of easy clarification, the Cr pixel and Cb pixel are overlapped in reality (i.e., the positions of Cb and Cr are the same).

Accordingly, wasted amount of data which is read/written in the event that the image data are processed per the field unit, becomes unduly large. Thereby, the amount of effective data which can be read/written from and to the memory per the unit time is reduced. As a result thereof, the wasted time for such an unnecessary pixel data is undesirably increased in the image coding and decoding apparatus. Thus, it takes much longer time to reconstruct a single image in the conventional practice. In other words, a size in which the image can be reconstructed is very limited.

As described above, when the image data are processed in the field unit, there is a problem where the read/write amount for the unwanted pixel data is undesirably large, so that the amount of the effective data which can be read/written from and to the memory is small in the conventional practice.

SUMMARY OF THE INVENTION

In view of the foregoing drawbacks, it is therefore an object of the present invention to provide an image coding and decoding apparatus which can produce an improved amount of the effective data per time unit especially in a case where the image data are processed in the field unit.

To achieve the object, there is provided an image-signal coding-decoding apparatus in which a plurality of pixel data are simultaneously accessed to a memory unit and the accessed pixel data are compressed and decompressed so as to be coded and decoded by processing a digital color image-signal in a field unit, the apparatus comprising: means for subtracting a reference image signal from an input image signal; intra-frame coding means for coding the image signal sent from the subtracting means, and data on the reference image signal; and first inter-frame prediction means for performing image prediction among previous or future image data and for sending the reference image signal to the subtracting means and the intra-frame coding means, the reference image signal being produced based on a previously reconstructed image signal from the memory unit, wherein the first inter-frame prediction means includes an input-output circuit in which pixel data of luminance signals are separated from those of color signals, and the thus separated pixel data are arranged in a single row of a horizontal direction as a minimum unit, so that the input-output circuit transfers data between the memory unit.

One advantage of the present invention is that the amount of effective data accessible in a time unit can be significantly increased in the course of processing data in the field unit.

BRIEF DESCRIPTION OF THE DRAWINGS

These and other objects, features and advantages of the present invention will become more apparent from the following description of the preferred embodiment taken in conjunction with the accompanying drawings, in which:

FIG. 1 illustrates the conventional technique for accessing the image pixels.

FIG. 2 more explicitly illustrates the conventional technique for accessing the image pixels.

FIG. 19 shows an overall configuration of the image-coding/decoding apparatus for describing the connection between FIG. 4 (first embodiment) and FIG. 8 (second embodiment).

DETAILED DESCRIPTION OF THE PREFERRED EMBODIMENTS

Features of the present invention will become apparent in the course of the following description of exemplary embodiments which are given for illustration of the invention and are not intended to be limiting thereof. Embodiments of the present invention will now be described with reference to the drawings.

BASIC TECHNIQUE (Embodiment No. 1)

Figure 4:
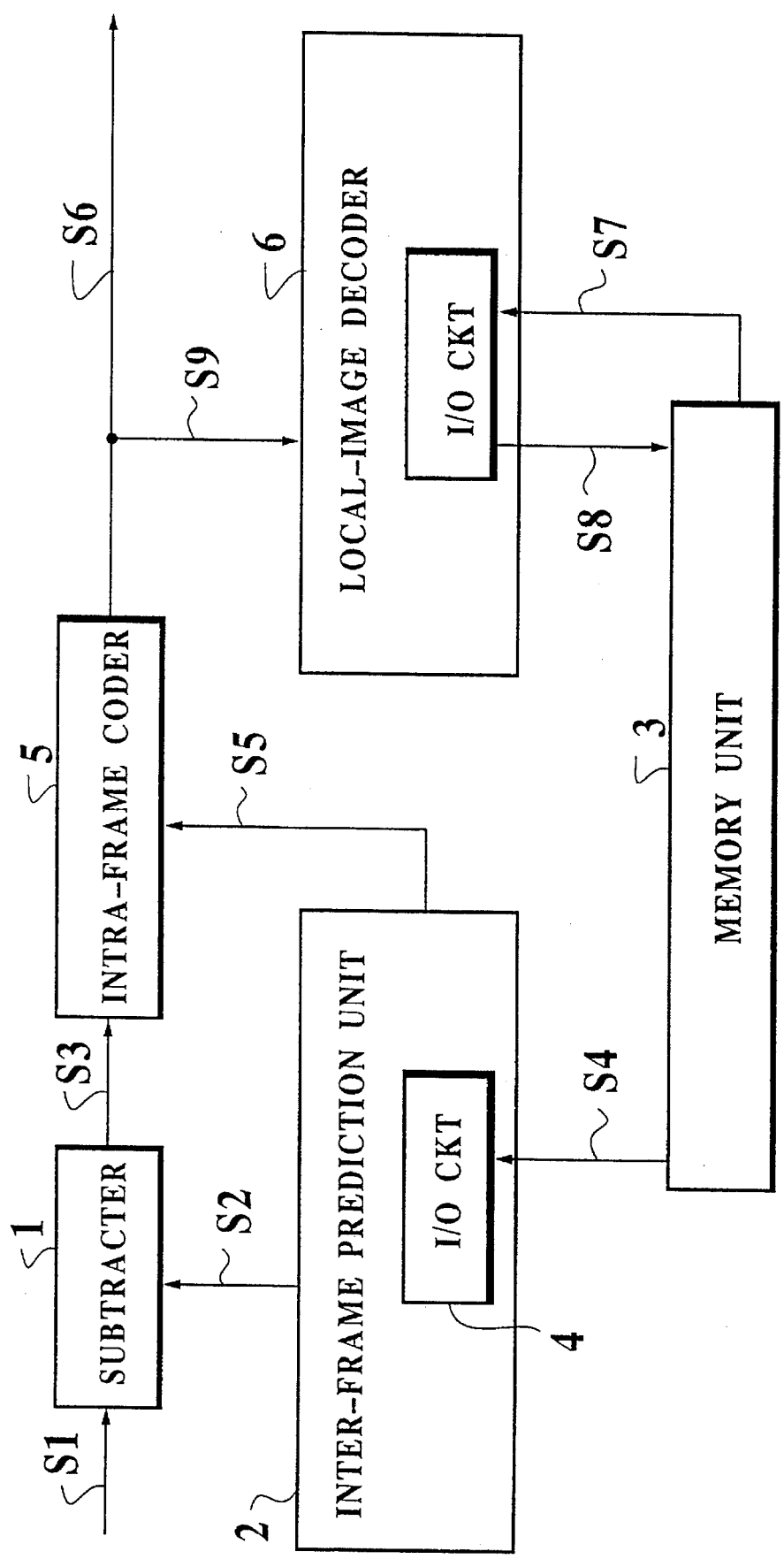
FIG. 4 shows an image coding apparatus according to the present invention (referred to as the basic technique or the first embodiment hereinafter).

With reference to FIG. 4, first of all, input image signal S1 is input to a subtracter 1. In the subtracter 1, a reference image signal S2 is subtracted from the input image signal S1, so as to generate an inter-frame difference image signal S3. Then, in an inter-frame prediction unit 2, an image signal S4 previously reconstructed is read out from a memory unit 3, so that the reference image signal S2 is formed by utilizing an appropriate technique.

The inter-frame prediction unit 2 includes an input-output circuit 4 to perform an input-output operation with the memory unit 3. In the input-output circuit 4, pixel data of luminance signals and pixel data of color signals are separated, and the pixel data in a horizontal line are separated vertically so that they are not crossed over more than two horizontal lines, when image data in the memory unit 3 are processed in a field unit. Moreover, data obtained in the input-output circuit 4 are transferred to an intra-frame coding unit 5.

Next, in the intra-frame coding unit 5, the inter-frame difference image signal S3 and data S5 about how to produce the reference image are coded, so as to be output as an output signal S6.

When the output signal S6 is output from the intra-frame coding unit 5, the output signal S6 is also input to a local image decoding unit 6. Thereby, in the local image decoding unit 6, a reconstruction image S8 is formed and is written to the memory unit 3. Then, in the local image decoding unit 6, the image S7 previously reconstructed is read out from the memory unit 3 in order to form the reference image. The reconstruction image thus written to the the memory unit 3 is read out by the input-output circuit 4 of the inter-frame prediction unit 2, in order to form the reference image. In the local image decoding unit 6, there is provided therein an input-output circuit 7 which is similar to the one provided in the inter-frame prediction unit 2.

Next, operation of the image signal coding apparatus will be described in detail.

For the sake of simplicity, a case for reading out the reference image is taken as an example. The image to be reconstructed is, for example, such that it is divided to 16 pixels in the horizontal direction and 16 pixels in the vertical direction.

The image corresponding to a macroblock is made in the following manner. Here, the macroblock indicates a picture area. The reference image comprised of 17 pixels in the horizontal direction and 17 pixels in the vertical direction are read out so that a neighboring pixel are averaged therebetween. As a result thereof, there is obtained the macroblock comprised of 16 pixels in the horizontal direction and 16 pixels in the vertical direction.

Here, the macroblock is defined to be a unit of the image area in the event of forming the reference image by the inter-frame prediction. In ISO MPEG standard, it is to be luminance 16 pixels×16 pixels and chrominance Cb 8 pixels×8 pixels plus Cr 8 pixels×8 pixels (in the case of the 4:2:0 mode). In the 4:2:2 mode, it represents the image area of luminance 16 pixels×16 pixels and chrominance Cb 9 pixels×16 pixels plus Cr 8 pixels×16 pixels.

Here, suppose that 8 pixels in image data comprised of luminance signals or chrominance signals are simultaneously and concurrently read from and written to the memory unit 3.

Referring to FIG. 4, it is, for example, presupposed that, as for a luminance signal, the image data composed of 1 pixel in the vertical direction and 8 pixels in the horizontal direction are simultaneously and concurrently read from and written to the memory unit 3 by way of the input-output circuit 4. As for a chrominance signal, a Cb signal composed of 1 pixel in the vertical direction and 4 pixels in the horizontal direction is simultaneously and concurrently read from and written to the memory unit while a Cr signal composed of 1 pixel and 4 pixels in the vertical direction and 4 pixels in the horizontal direction for the same position with the Cb signal independent from the luminance signal is read from and written to the memory unit 3.

Here, the relation between the luminance signal Y, and two color difference signals Cb, Cr is described as follows. When the original signals are denoted respectively R, G, B, luminance signal Y and two color difference signals Cb, Cr are expressed by the following equations:

Y is expressed by a linear combination of R, G and B;

Cr=R−Y

Cb=B−Y

Next, described hereinbelow is an image form in which the color signal is compressed by half in the horizontal direction alone, that is, 4:2:2 image mode.

In the 4:2:2 image mode, the reference image for the color signal is 9 pixels in the horizontal direction and 17 in the vertical direction for each Cb and Cr.

In the present invention where the pixel data of the luminance signal and the pixel data of the color signal are processed separately from each other, the pixel data of the luminance signal and the color signal are read out 3 times in the horizontal direction and 17 times in the vertical direction, respectively. Thus, the number of 102 (=3×17×2) is read out. Then, as for the luminance signal, 7 pixels (=8× 8−17) for each line are read out unnecessarily. Since the data are read out 17 times in the vertical direction, 119 pixels (=7×17) are read out unnecessarily overall.

Similarly, as for the color signal, 6 pixels (=8×3 −9×2) for each line are read out unnecessarily. Since the data are read out 17 times in the vertical direction, 102 pixels (=6×17) are read out unnecessarily overall. Therefore, for both luminance signals and color signals, 221 pixels (=119+102) are read out unnecessarily as a whole.

Figure 14A:
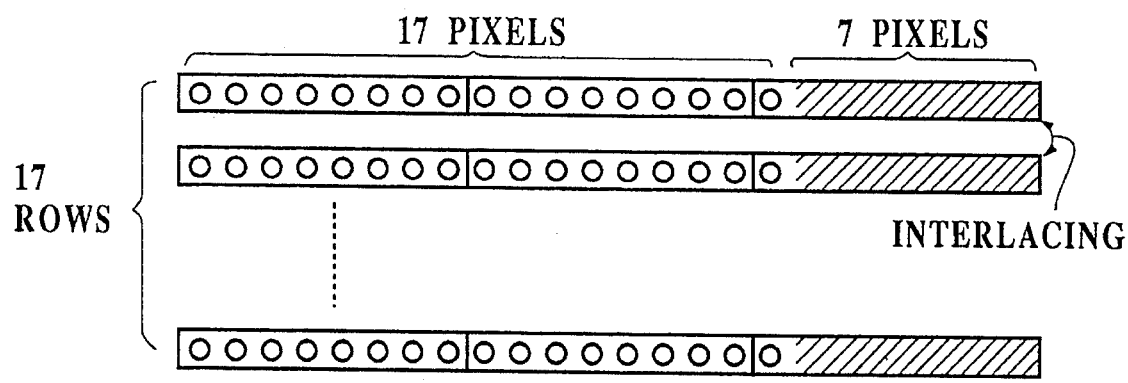
FIG. 14A illustrates the number of pixels to be read out, in a field unit, from the memory unit for luminance signal Y, according to the present invention.
Figure 14B:
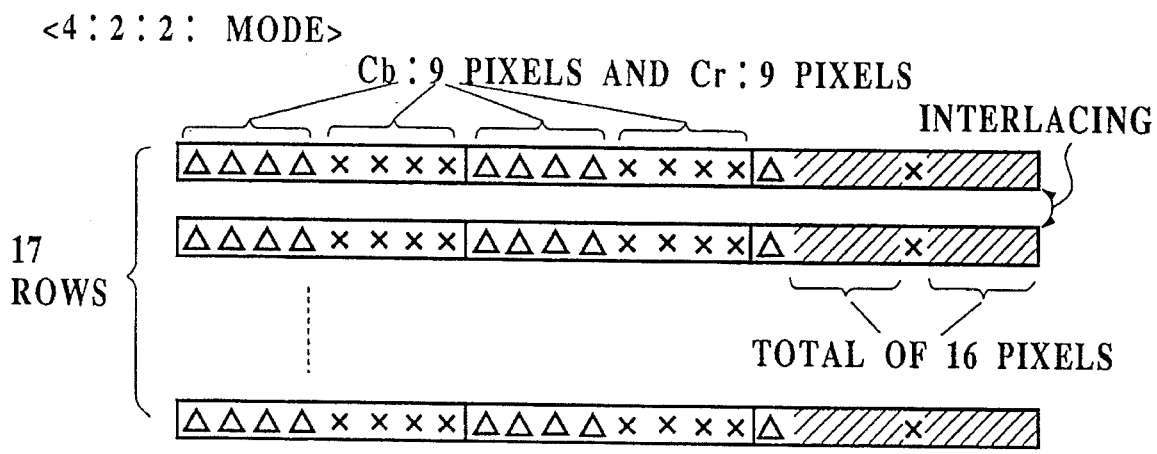
FIG. 14B illustrates the number of pixels to be read out, in a field unit, from the memory unit for a pair of color signals Cb, Cr, according to the present invention.

Illustrative description therefor is presented in FIG. 14A and FIG. 14B.

Referring to FIG. 14A in a case of reading pixel data in the field unit under the 4:2:2 mode, the luminance pixels (Y) are read out from the memory, per 8 pixels, in parallel. 17 divided by 8 makes a quotient of 2 and a residue of 1. In other words, luminance signals (Y) are read three times in the horizontal direction, as well as 17 times in the vertical direction (17 rows). Therefore, as for the luminance data (Y), 7 pixels per one row are unnecessary read out. As a whole 7×17=119 pixels are read unnecessary, as illustrated by a hatched portion in FIG. 14A.

Similar to the color signals under the 4:2:2 mode, referring to FIG. 14B in a case of reading pixel data in the field, total of 6 pixels of the color signals (Cb, Cr) per row are read out from the memory unnecessarily. Here, it is to be noted that when the RGB signal is converted to Y, Cb, Cr signal by taking a certain matrix over the RGB signal, Cb-Cr signals are always read as a pair. Now, as a whole, 6×17 rows=102 pixels are unnecessarily read out as for the color signals.

Subsequently, referring to both FIG. 14A and FIG. 14B, a net total of 119+102=221 pixels are read out unnecessarily.

On the other hand, in the conventional practice shown in FIG. 1, when data are read out only in a frame unit, the data need be read out 9 times in the horizontal direction and 9 times in the vertical direction. Thus, 81 times (9×9) are read out. Then, for each line, 1 pixel (=2×9−17) is read out unnecessarily. Adding unnecessary reading number for the lowest line, 53 pixel data (=1×17+4×9×1) are read out unnecessarily.

However, when the data are read out in a field unit in the conventional practice, unnecessarily read data are generated for every other line. Therefore, data are read out for 17 times in the vertical direction, so that as much as 629 pixels (=1×17+4×9×17) are read out unnecessarily.

Figure 3:
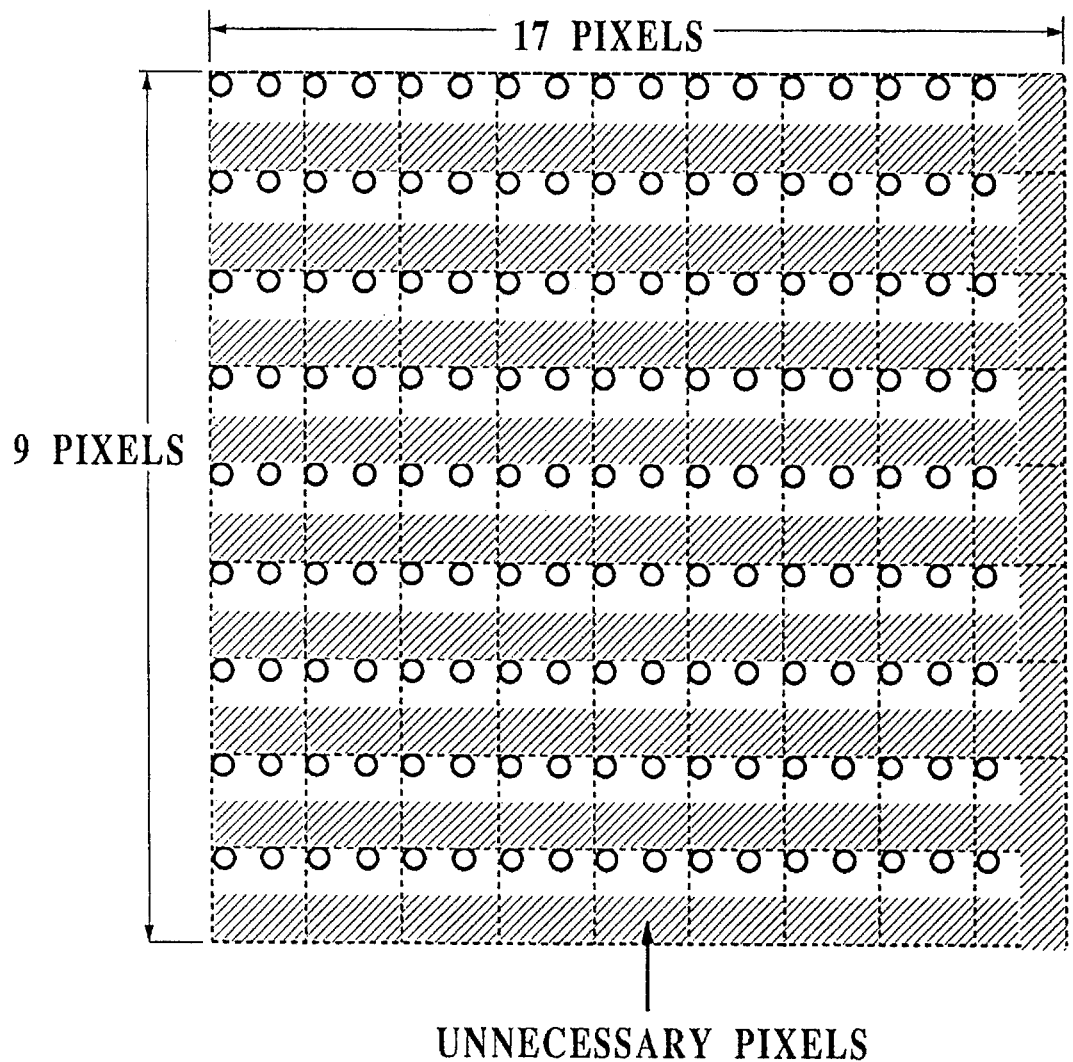
FIG. 3 illustrates the conventional technique for reading the image pixels where the hatched region corresponds to the pixels which are unnecessarily read out.
Figure 13:
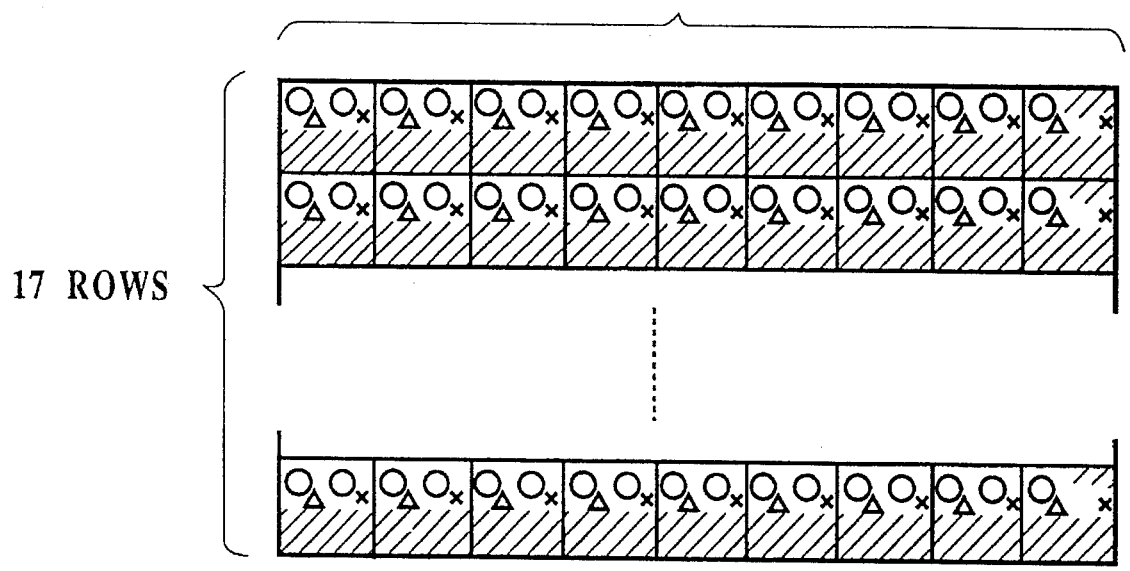
FIG. 13 shows the conventional example where 17 (plus 9 Cb pixels and 9 Cr pixels)×17 rows are read out from the memory unit, and the hatched regions correspond to the pixels that are unnecessarily read out then.

Conventional technique is illustrated in detail in FIG. 2, FIG. 3 and FIG. 13.

As described above, when the data are read out in the field unit, the amount of the unnecessarily read data in the present invention is reduced to approximately one third compared to the conventional practice at the time of reading out the reference image data. As a result thereof, effective data amount that can be read out in a time unit is significantly increased by employing the present invention.

As for a 4:2:0 image mode in which the color signal is compressed by half in both the horizontal direction and the vertical direction, the present invention shows further advantageous aspects over the conventional practice. Let us demonstrate such a superior advantage in a similar manner as in the 4:2:2 image mode.

As for the color signal, the size of data to be read is 9 pixels in the horizontal direction and 9 pixels in the vertical direction for each chrominance signal Cb and Cr. Then, the pixel data for the color signal need be read out 3 times in the horizontal direction and 9 times in the vertical direction. Therefore, together with the pixel data for the luminance signal, the data are read out 78 times (=3×17+3×9). Then, since the pixel data for the color signal are read out 9 times in the vertical direction, 54 pixel data (=6×9) are overall read out unnecessarily. Therefore, for both luminance signals and color signals, 173 pixels (=119+54) are read out unnecessarily as a whole.

On the other hand, in the conventional practice shown in FIG. 1, when data are read out only in a frame unit, the data need be read out 9 times in the horizontal direction and 9 times in the vertical direction. Then, the pixel data of the color signal that are equal to 162 pixels (=2×9×9) are unused. As a consequence, 192 pixels (=1×17 +2×9×1+162) are read out unnecessarily. Thus, even in a case where the data are read out only in the frame unit, the amount of the unnecessarily read data are smaller (173<192) than in the conventional practice.

Moreover, when the data are read out in a field unit, 778 pixels (=4×9×17+2×9×8) are unnecessarily read out in the conventional practice.

As described above, when the 4:2:0 image mode is utilized and the data are read out in the field unit, the amount of wasteful reading can be reduced to more than one fourth compared with the conventional practice. As a result thereof, effective data amount that can be read out in a time unit is further significantly increased by employing the present invention.

Figure 5:
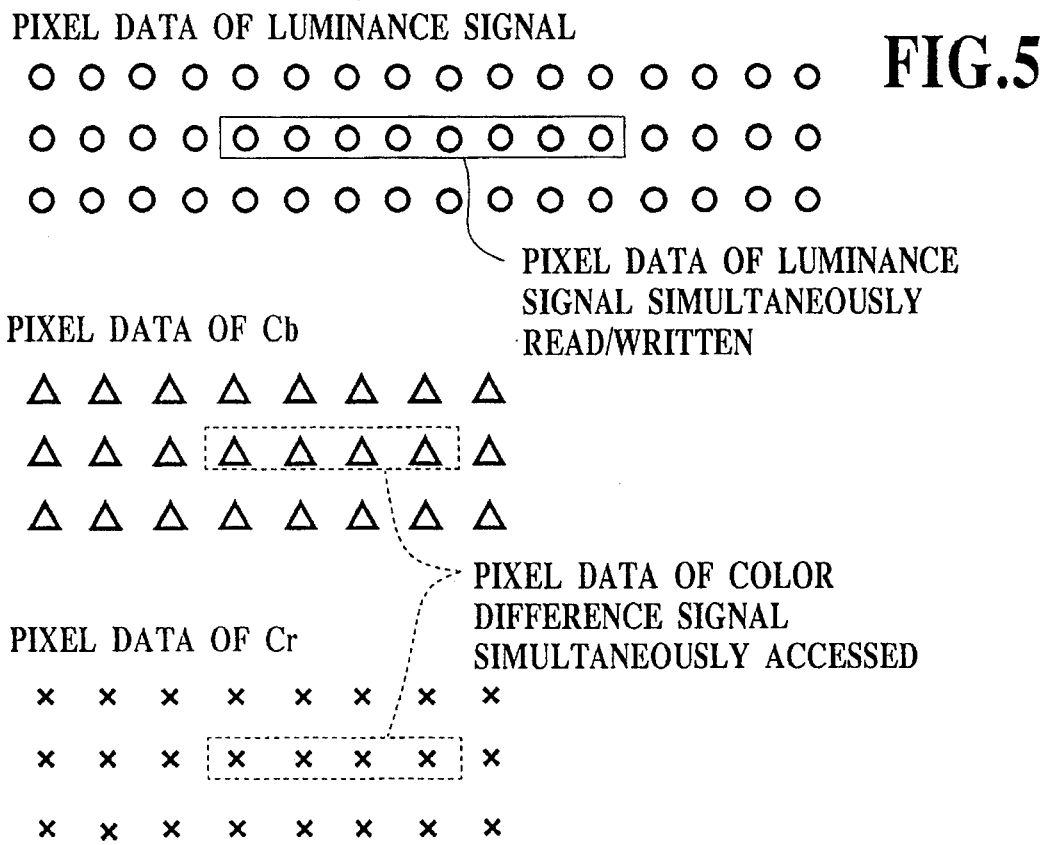
FIG. 5 illustrates a technique for accessing the image pixels-according to the present invention.
Figure 6:
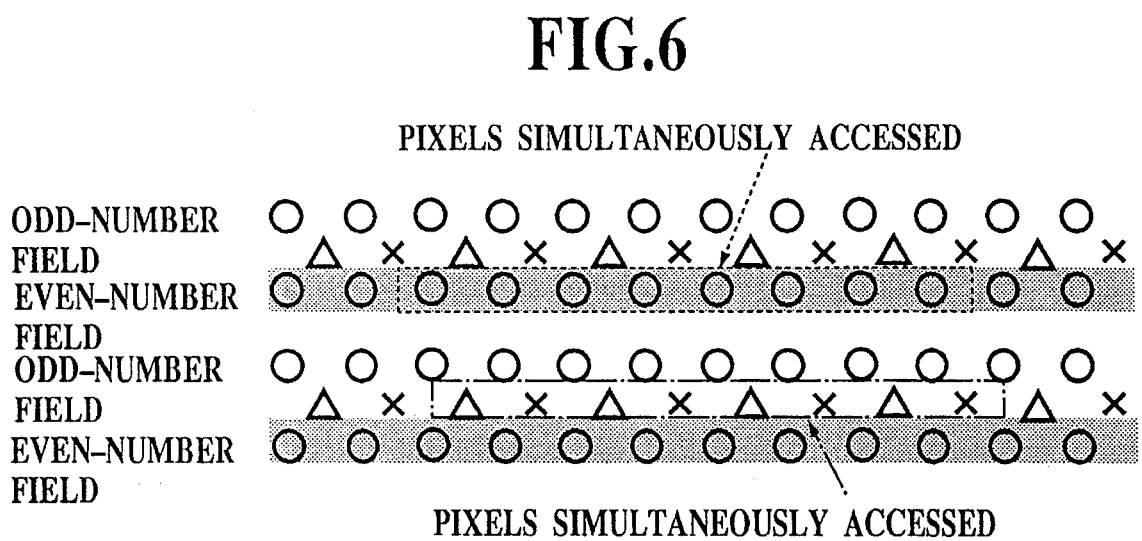
FIG. 6 more explicitly illustrates the technique for accessing (reading/writing) the image pixels.
Figure 7:
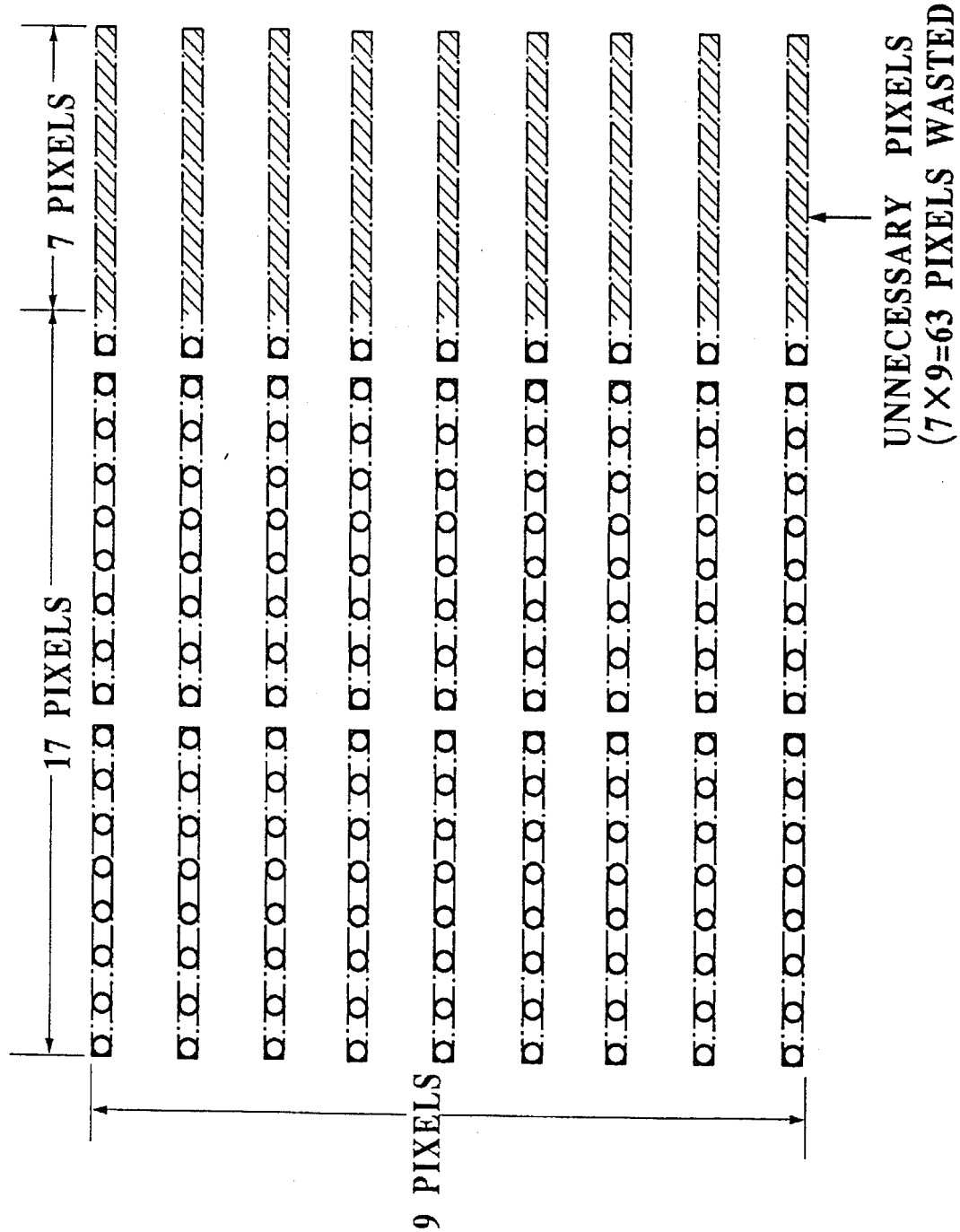
FIG. 7 illustrates reading of reference image in a field unit, in terms of reading the luminance signals, where the hatched regions correspond to the pixels that are not used in image reconstruction.

In the embodiment shown in FIGS. 4 and 5, the number of pixel data to be simultaneously accessed is set to 8. As for other number of pixel data to be simultaneously accessed, the same advantage may be obtained in such a manner that the pixel data of the luminance signals are separated from the pixel data of the color signals, and the pixel data are separated per each row in the vertical direction so as to be read/written from and to the memory unit.

In the first embodiment, as for the color signals, both the Cb signal (4 pixel) and Cr signal (4 pixel) are simultaneously accessed in the memory unit. It shall be appreciated that the Cb signal and the Cr signal may be separately processed.

Moreover, since the pixel data are read/written by separating the luminance signal from the color signal, the present invention is flexibly acceptable for other image modes than the 4:2:0 and 4:2:2 modes.

Embodiment No. 2

Figure 8:
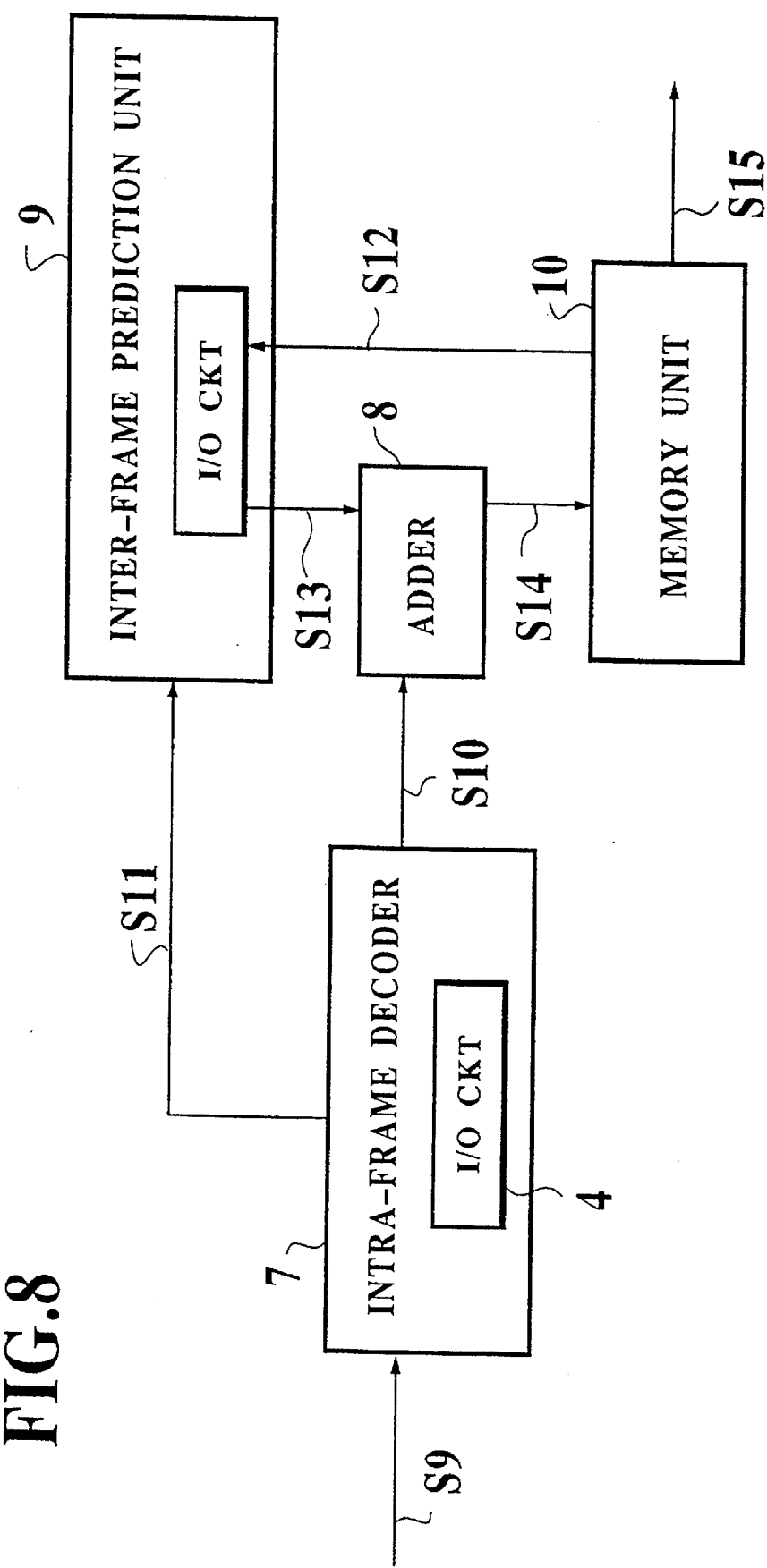
FIG. 8 shows an image decoding apparatus according to the second embodiment of the present invention.

Referring to FIG. 8, first of all, input signal S9 is input to intra-frame decoder 7. In the intra-frame decoder 7, the input signal is decoded so that inter-frame difference image signal S10 and data S11 for making a reference image are generated. In the intra-frame decoder 7, there is provided therein an input-output circuit (I/O CKT) 4 similar to that shown in FIG. 4. By way of the input-output circuit 4, the image data are output to adder 8. The data S11 is sent to inter-frame prediction unit 9.

In the inter-frame prediction unit 9, by reading from a memory unit 10 an image S12 that is previously reconstructed, a reference image signal S13 is generated based on the data S11. In the inter-frame prediction unit 9, there is provided therein an input-output circuit similar to that shown in FIG. 4. Through this input-output circuit in the inter-frame prediction unit 9, the image data are accessed to and from the adder 8 and memory unit 10.

Next, in the adder 8, the inter-frame difference image signal S10 and the reference image signal S13 are summed up so as to produce a reconstruction image S14. The reconstructed image S14 is written to the memory unit 10. Thus written contents are read out in order to produce the reference image at a later stage. Finally, in order to display the image, the reconstruction images are read from the memory unit 10 so as to be an output image signal S15.

Again, the reference image is read out from the memory unit 10, and is then interpolation-processed by the inter-frame prediction unit 9, and is then input to the adder 8; in other words, the reference image data are input to adder 8 in the order shown in FIG. 8 (S12→9→S13→8).

In the above-described Embodiment No. 2 shown in FIG. 8, there is shown a preferred internal construction of the local image decoder as shown in FIG. 4. Thus, referring to FIG. 19 the reconstructing image signal S8 in FIG. 4 corresponds to a signal S14 of FIG. 8, whereas the image previously reconstructed S7 of FIG. 4 corresponds to a signal S12 of FIG. 8. Moreover, as shown in FIG. 19, the memory unit 8 of FIG. 4 and the memory unit 10 of FIG. 8 is preferably an integrated single memory unit. An output image signal S15 shown in FIG. 8 may not be provided thus.

Accordingly, in the second embodiment, the local image decoder 6 thus constructed as shown in FIG. 8 is provided within a whole system of the image coding-decoding apparatus with a shared memory unit 3, 10 (see also FIG. 19), so that the occurrence of an image error can be suppressed minimally.

Now, let us describe why the local image decoder is provided within the whole system of image processing apparatus, in detail, hereinbelow.

Significance of providing the local image decoder 6 within the whole system of image processing apparatus as shown in FIG. 19

In FIG. 4, as the image signal S4, there is used the image that is reconstructed by the local image decoder 6. Now, suppose that an original image is used for S4, instead of using the reconstructed image. In this case, the subtracter 1 takes a difference between the original image and a reference image S2 which is made by the inter-frame prediction unit based on, say, a previous original image. Then, this difference is coded by the intra-frame coder, so that a result thereof is output therefrom as the output signal S6. This output signal S6 is distributed through a communication path or a storage medium.

Next, the distributed signal is decoded by a decoding apparatus shown in FIG. 8, so as to obtain the original image (more precisely, an original image that is close to the original image). In FIG. 8, first of all, the input signal is decoded by the intra-frame decoder 7, so that the inter-frame difference image S10 is obtained. Though it is desirous that the value of S3 in FIG. 4 be the same as the value of S10 in FIG. 8, the value of S10 does not become the same with the value of S3 because the calculation accuracy of the apparatus is limited so as to cause an error. Therefore, the signal S14 which is a result of addition of the S10 and the reference signal S13, contains the error. Then, the reconstructed image which is written to the memory unit 10 also contains the error.

Next, the thus reconstructed image will be used as a reference image. However, since this reconstructed image contains the error, the reference signal S13 in FIG. 8 does not coincide with the reference signal S2 in FIG. 4. As a result thereof, the signal S14 will contain the errors from both the inter-frame difference image signal S10 and the reference signal S13. When this is repeated, the error is circulated in the order of S14, memory unit 10, S12, inter-frame prediction unit 9, S13, adder 8 and S14. Consequently, the error is accumulated to be an undesirably huge one.

On the other hand, by utilizing, as the image signal $4, the image reconstructed by the local image decoder, such an error accumulation described above will not occur. When the calculation accuracy of the local image decoder in FIG. 4 coincides with that of the decoding apparatus shown in FIG. 8, the value of S8 in FIG. 4 will coincide with the value of S14 in FIG. 8. In other words, the value of S4 or S14 coincides with the reconstructed image written in the memory unit 10. Thus, when this reconstructed image is utilized as the reference image in FIG. 4, the reference signal S13 in FIG. 8 will coincide with the reference signal S2 in FIG. 4. Therefore, in the reconstruction signal S14 there contains only error data from the inter-frame difference image signal S10. In other words, the error is not circulated nor accumulated to cause the huge error. Thereby, the only calculation error of the intra-frame decoder 7 in FIG. 8, if any, will enter into the reconstruction image.

Accordingly, by providing the local image decoder 6 within a whole system of the image processing apparatus with a shared memory unit 3, 10 (see also FIG. 19), the occurrence of an image error can be suppressed to a minimum.

Half-pixel interpolation technique

Here, let us briefly describe a typical interpolation technique called the half-pixel interpolation technique, with reference to FIGS. 9–12.

Figure 9:
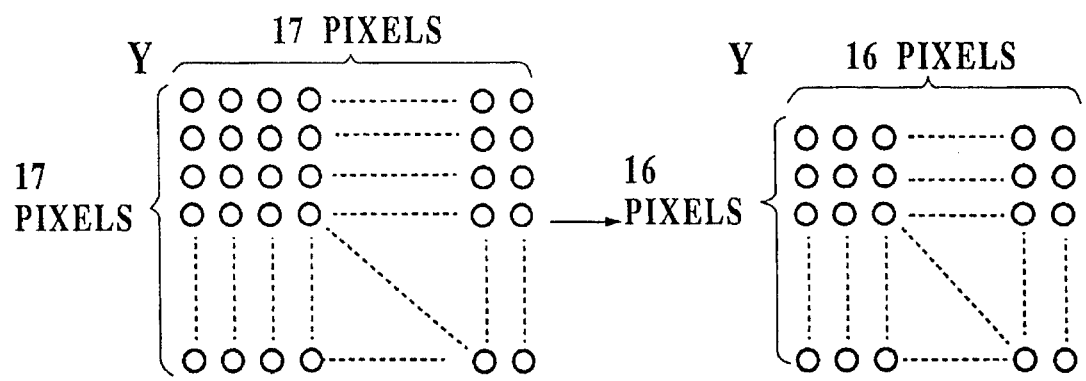
FIG. 9 illustrates a half-pixel interpolation for Y data after the reference images are read out in FIG. 9, the left column shows the number of Y pixels to be read out from the memory unit 10, whereas the right column shows a case where an average is taken on the adjacent pixels shown in the left columns.

FIG. 9 illustrates a half-pixel interpolation for Y data after the reference images are read out. In the same figure, the left column shows the number of Y pixels to be read out from the memory unit 10, whereas the right column shows a case where an average is taken on the adjacent pixels shown in the left column.

Figure 10:
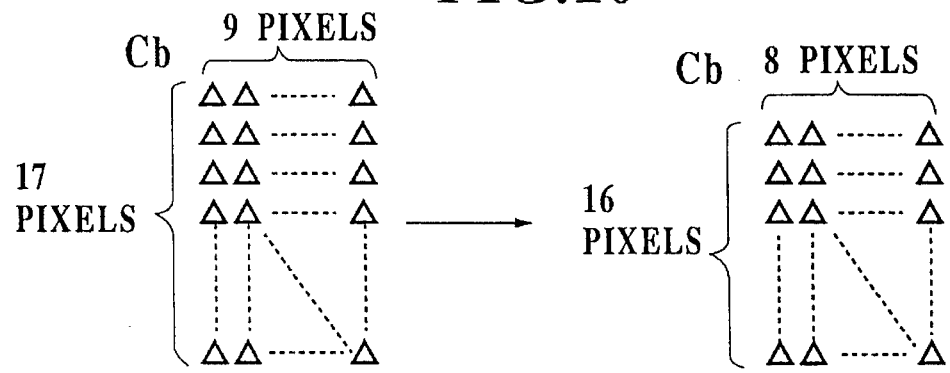
FIG. 10 and FIG. 11 show the half-pixel interpolation for C data with Cb and Cr, respectively, in the 4:2:2 mode. The left column shows the number of Cb and Cr pixels to be read out from the memory unit 10, whereas the right column shows a case where an average is taken of the adjacent pixels shown in the left column.
Figure 11:
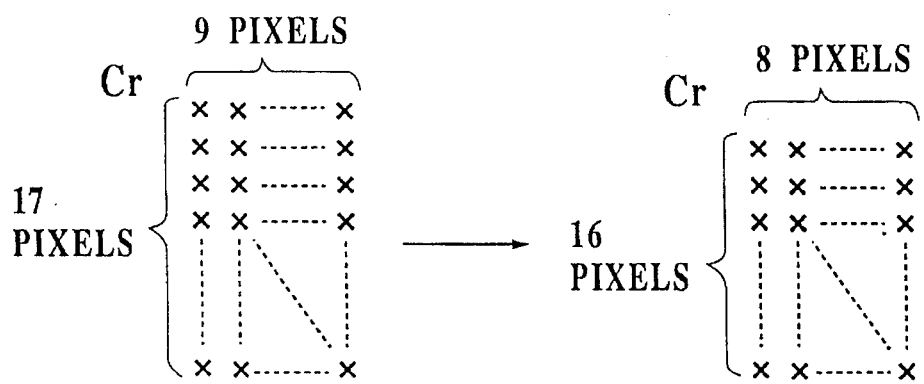

FIG. 10 and FIG. 11 show the half-pixel interpolation for C data with Cb and Cr, respectively, in the 4:2:2 mode. In the same figures, the left column shows the number of Cb and Cr pixels to be read out from the memory unit 10, respectively, whereas the right column shows a case where an average is taken on the adjacent pixels shown in the left column.

Figure 12:
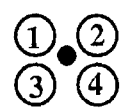
FIG. 12 illustrates the half-pixel interpolation technique in a self-explanatory manner.

FIG. 12 illustrates the half-pixel interpolation technique in which a value of pixel (black dot in the middle in FIG. 12) is obtained by taking an average of four adjacent pixels.

INTERNAL CIRCUIT OF I/O CIRCUIT 4 OF THE INTRA-FRAME DECODER 7

Figure 15:
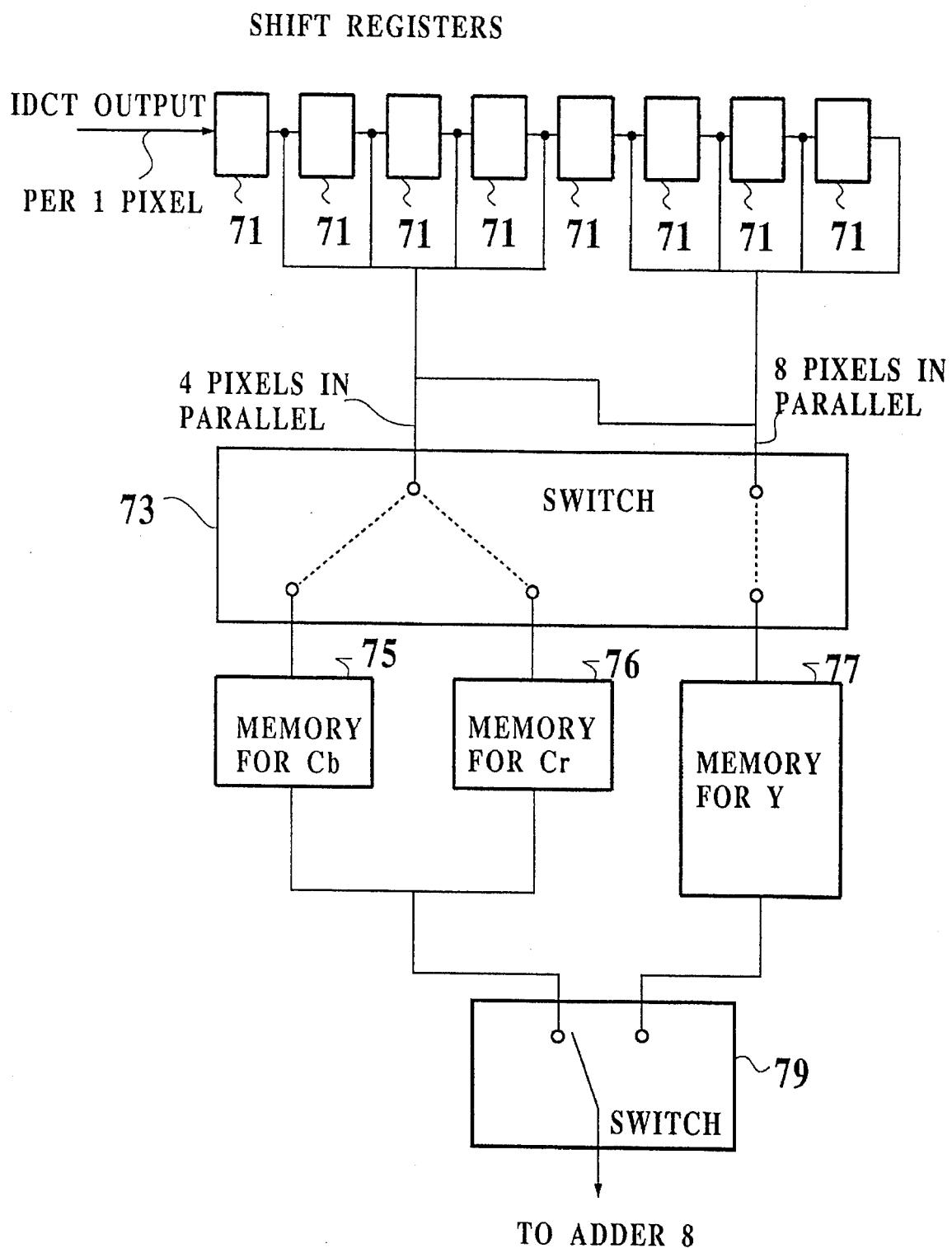
FIG. 15 shows an example for the input-output circuit 4 of the intra-frame decoder shown in FIG. 8 as well as in FIG. 19.

Next, referring to FIG. 15, there is shown an example for the input-output circuit 4 of the intra-frame decoder shown in FIG. 8 as well as in FIG. 19. In contrast thereto, referring to FIG. 17, there is also shown the conventional example of the input-output circuit of the intra-frame decoder.

With reference to FIG. 15, an output of IDCT (Inverse Discrete Cosine Transform) is shifted per pixel by a shift register 71.

As for Y pixels, the Y pixel data are written to memory for Y 77 in a unit of 8 pixels through a switch every time the 8 pixel data are stored up in the shift register 71. Namely, the 8 pixel data are written to a memory address then.

As for C pixels, the C pixel data are written to either a memory for Cb 75 or a memory for Cr 76 in a unit of 4 pixels through the switch 73, every time the 4 pixel data are stored up in the shift register 71. Namely, the 4 pixel data are written to a memory address.

Thereafter, as for the Y pixels, 8 pixels thereof are read out in parallel from the memory for Y 77, and then are output to the adder 8 by way of a switch 79. As for the C pixels, the 4 pixels from the memory for Cb 75 and the 4 pixels from the memory for Cr 76, i.e., a total of 8 pixels are read out in parallel. Then, the total of the read-out 8 pixels are output to the adder 8 by way of the switch 79.

Figure 17:
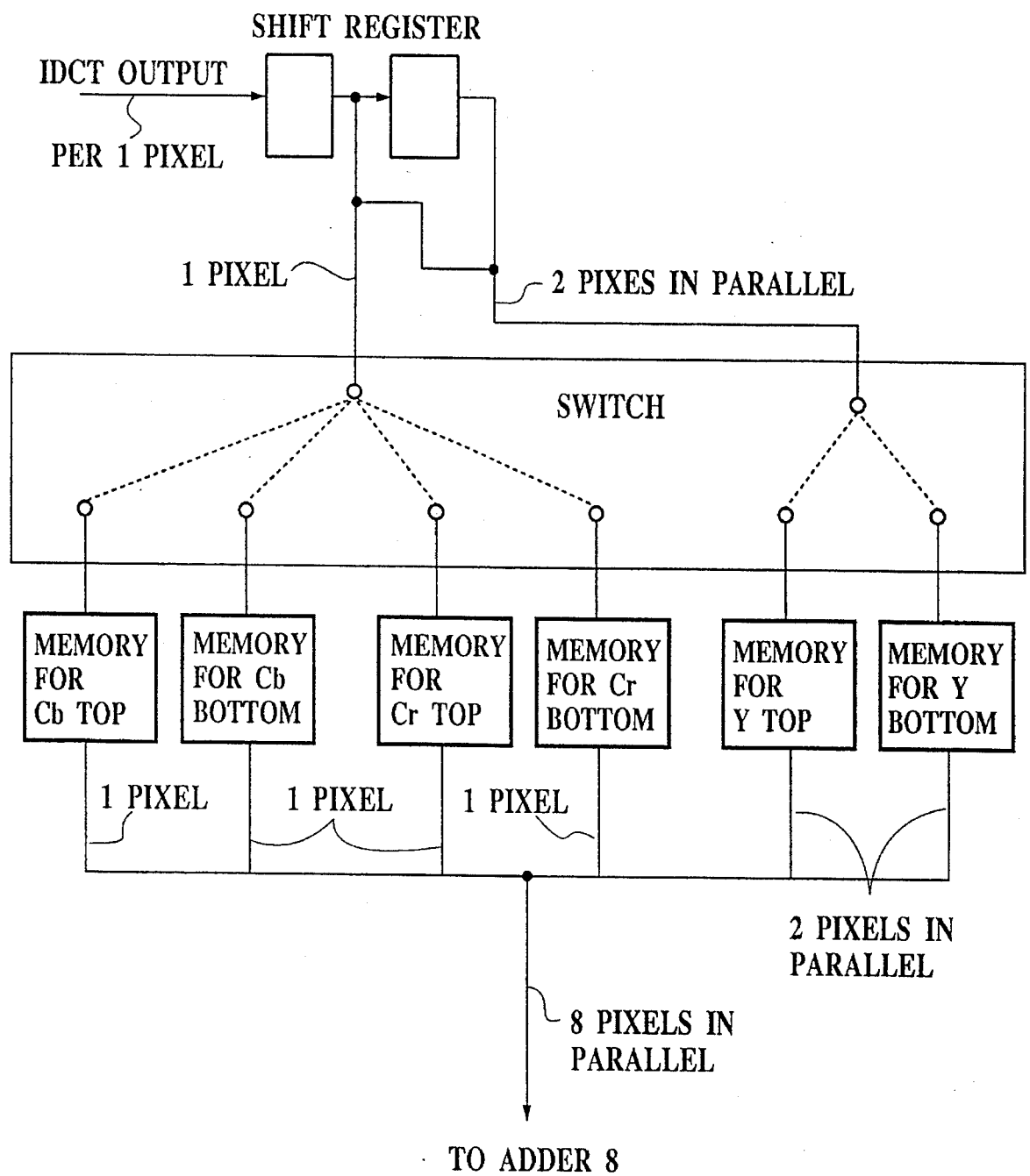
FIG. 17 shows the conventional example of the input-output circuit of the intra-frame decoder, in contrast to that shown in FIG. 15.

In contrast to the above example of the present invention, FIG. 17 shows the conventional example. In FIG. 17, the IDCT output is shifted per pixel by a shift register. As for the Y pixels, the Y pixel data are written to either a memory for Y top or a memory for Y bottom whichever is appropriate then, through a switch in a unit of 2 pixels, for every time the 2 pixel data are stored up in the shift register. Namely, the 2 pixel data are written to a memory address. As for C pixels, the C pixel datum is written to one of a memory for Cb top, a memory for Cb bottom, a memory for Cr top or a memory for Cr bottom whichever is appropriate then, through a switch in a unit of 1 pixel. Namely, the 1 pixel datum is written to a memory address. Thereafter, 2 pixels from the memory for Y top, 2 pixels from the memory for Y bottom, 1 pixel from the memory for Cb top, 1 pixel from the memory for Cb bottom, 1 pixel from the memory for Cr top, and 1 pixel from the memory for Cr bottom, i.e., a total of 8 pixels are read out in parallel and are output to an adder.

INTERNAL CIRCUIT OF INTER-FRAME PREDICTION UNIT 9

Figure 16:
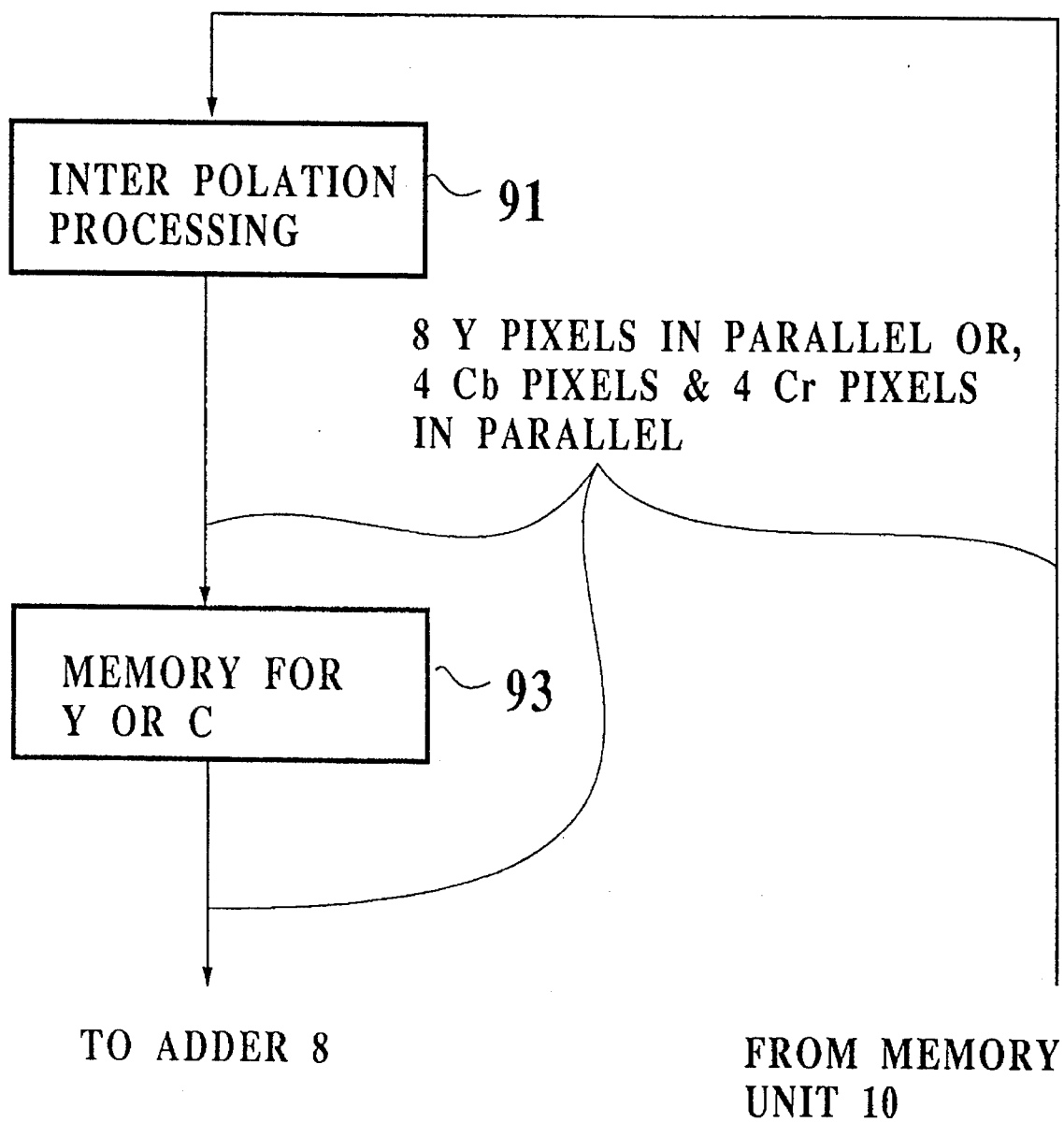
FIG. 16 shows an example of,the inter-frame prediction unit 9 shown in FIG. 8 and FIG. 19.
Figure 18:
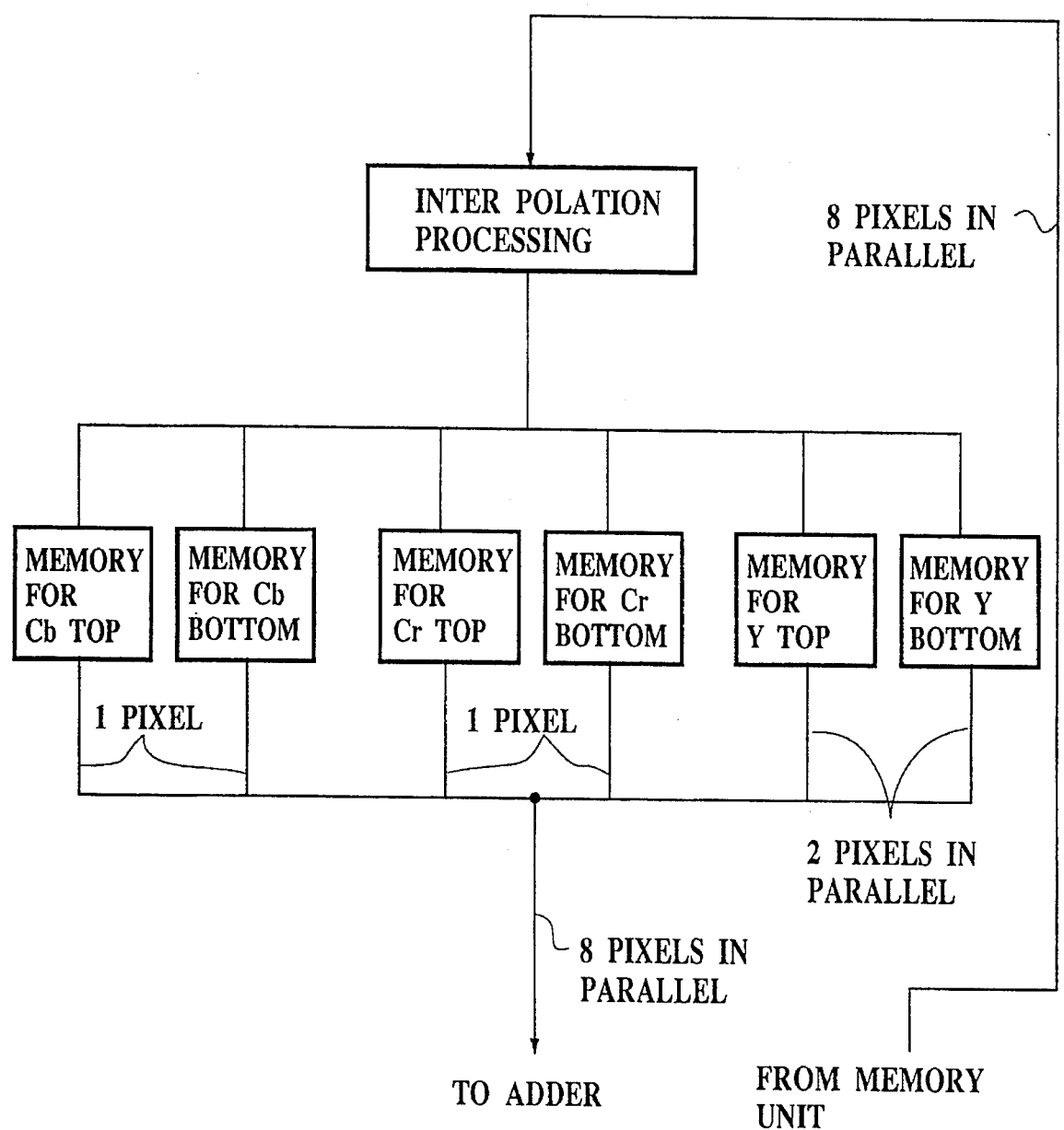
FIG. 18 shows the conventional example of the inter-frame prediction unit, in comparison to the present invention represented by FIG. 16.

Next, FIG. 16 shows an example of the inter-frame prediction unit 9 shown in FIG. 8 and FIG. 19. FIG. 18 shows the conventional example of the inter-frame prediction unit, in comparison to the present invention represented by FIG. 16.

Referring to FIG. 16, in a memory address of the memory unit 10 there are written therein either a total of 8 pixels composed of 8 pixels of the Y data or a total of 8 pixels composed of 4 pixels of Cb data and 4 pixels of Cr data. Thus, when data are read out from the memory unit 10, data are read out in this unit, and the read-out data are written to a memory 93 in parallel in a unit of 8 pixels, after a process of interpolation. Similarly, data are read out from the memory 93 in the same manner so as to be output to the adder 8.

On the other hand, referring to FIG. 18 showing the conventional example of the inter-frame prediction unit, in a memory address of the memory unit there are written therein a total of 8 pixels composed of 2 pixels of Y top data, 2 pixels of Y bottom data, 1 pixel of Cb top datum, 1 pixel of Cb bottom datum, 1 pixel of Cr top datum and 1 pixel of Cr bottom datum. Thus, when data are read out from the memory unit, data are read out in this unit, and the read-out data are written to the memories in a unit of 8 pixels in parallel, after an interpolation process by which an average is taken among adjacent pixels. Similarly, data are read out from the memories in the same manner so as to be output to the adder.

Next, referring to FIG. 15 through FIG. 18, the superior aspects in terms of construction and operation of the present invention over the conventional practice will be described hereinbelow.

In the circuit configuration employed in the present invention, there is an advantage in that the number of pixels that can be written to the memory unit 10 is significantly large in a time unit, since the number of unnecessary reading is minimized as described in the BASIC CONFIGURATION (first embodiment).

In the course of considering the superiority in circuit construction, hardware occupancy may be a major concern. A memory unit occupies a rather large area in the construction. Comparing FIG. 15 with FIG. 17, since a total capacity of the internal memory is the same for each case, the hardware amount would be almost the same for each case. Comparing FIG. 16 with FIG. 18, in the configuration employed in FIG. 16, the memory 93 can serve both as a memory for Y and a memory for C. This is so because, after the Y data are read from the external memory unit 10 and are written to the internal memory 93 by way of the interpolation process and then are read out therefrom to be output to the adder, the C data are read from the external memory unit 10. Namely, a temporal exclusive control is performed for Y and C pixels.

On the other hand, in the conventional configuration represented by FIG. 18, both the Y data and the C data are read out at the same time, so that the temporal exclusive control can not be performed. Therefore, the memory for Y data, memory for Cb and memory for Cr are all necessary. Thus, the configuration achieved by the present invention illustrated in FIG. 16 has less hardware by the amount of memories for Cb and Cr, thus being superior over the conventional configuration. It is to be noted that the total contents of the memories for Cb and Cr are equal to or less than those of memory for Y.

In summary, by employing the present invention, amount of effective data accessible in a time unit can be significantly increased in the course of processing data in the field unit. As a result thereof, the processing time consumed for reading/writing from and to the memory unit is significantly reduced in the image coding-decoding apparatus, so that time necessary for reconstructing an image is greatly reduced. In other words, much larger images can be reconstructed within a same time period compared with the conventional practice.

Besides those already mentioned above, many modifications and variations of the above embodiments may be made without departing from the novel and advantageous features of the present invention. Accordingly, all such modifications and variations are intended to be included within the scope of the appended claims.

What is claimed is:

1. An image-signal coding-decoding apparatus comprising:
   (a) a means for subtracting a reference image signal from an input image signal to obtain an image signal;
   (b) an intra-frame coding means for coding the image signal output from the subtracting means, and data on the reference image signal;
   (c) a memory unit;
   (d) a first inter-frame prediction means for performing image prediction among previous or future image data and for sending the reference image signal to the subtracting means and the intra-frame coding means, the reference image signal being produced based on a previously reconstructed image signal from the memory unit, the first inter-frame prediction means including an input-output circuit in which pixel data of luminance signals are separated from those of color signals, and the separated pixel data are arranged in a single row of a horizontal direction as a minimum unit, so that the input-output circuit transfers data to the memory unit;
   (e) an intra-frame decoding means for decoding the image signal sent from the intra-frame coding means, so as to produce an inter-frame difference image signal and a data signal on how to generate the reference signal;
   (f) a second inter-frame prediction means for producing a reference image signal based on the data signal sent from the intra-frame decoding means, and the previously reconstructed image signal read out from the memory unit; and
   (g) an addition means for adding the inter-frame difference image signal output from the intra-frame decoding means, to the reference image signal sent from the second inter-frame prediction means, and for sending the added signal to the memory unit,
   wherein the intra-frame decoding means includes:
      a plurality of shift registers by which the image signal is shifted per pixel;
      a first switch means for receiving and switching the shifted pixels from the shift registers;
      a first memory means in which only luminance pixel data are written thereto in a unit of 8 pixels;
      a secondary memory means in which only a pair of color pixel data are written thereto through the first switch means, every time 4 pixel data for each of color pixel data are stored in the shift registers; and
      a second switch means for receiving and switching the data sent from the first or second memory means and for sending the switched data to the addition means.

2. An image-signal coding-decoding apparatus as claimed in claim 1,
   wherein the second inter-frame prediction means includes storage means for accessing either the luminance pixel data or the color pixel data, and for sending the accessed data to the addition means.

* * * * *